United States Patent
Daniel et al.

(10) Patent No.: US 11,117,501 B2
(45) Date of Patent: Sep. 14, 2021

(54) POSITION-VARIABLE SEAT BACK HINGE STIFFNESS FOR BELT-INTEGRATION SEATS

(71) Applicant: Waymo LLC, Mountain View, CA (US)

(72) Inventors: Thomas Daniel, San Francisco, CA (US); Daniel Lynn Larner, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/534,161

(22) Filed: Aug. 7, 2019

(65) Prior Publication Data

US 2019/0359097 A1 Nov. 28, 2019

Related U.S. Application Data

(62) Division of application No. 15/792,937, filed on Oct. 25, 2017, now abandoned.

(51) Int. Cl.
| | | |
|---|---|---|
| *B60N 2/427* | (2006.01) | |
| *B60N 2/433* | (2006.01) | |
| B60N 2/68 | (2006.01) | |
| B60N 2/42 | (2006.01) | |

(52) U.S. Cl.
CPC ......... *B60N 2/42745* (2013.01); *B60N 2/433* (2013.01); *B60N 2/4221* (2013.01); *B60N 2/42772* (2013.01); *B60N 2/688* (2013.01)

(58) Field of Classification Search
None
See application file for complete search history.

(56) References Cited

U.S. PATENT DOCUMENTS

| | | |
|---|---|---|
| 4,040,660 A | 8/1977 | Barecki |
| 4,634,182 A | 1/1987 | Tanaka |
| 5,454,622 A | 10/1995 | Demopoulos |
| 5,597,205 A | 1/1997 | Glance et al. |

(Continued)

FOREIGN PATENT DOCUMENTS

| | | | | |
|---|---|---|---|---|
| CN | 102632819 A | * | 8/2012 | ............. B60N 2/427 |
| KR | 20090106888 A | | 10/2009 | |

OTHER PUBLICATIONS

ISR and Written Opinion for application No. PCT/US2018/057040 dated Mar. 8, 2019.

*Primary Examiner* — David E Allred
(74) *Attorney, Agent, or Firm* — Botos Churchill IP Law LLP

(57) ABSTRACT

The disclosure provides for a system that includes a seat mounted in a vehicle. The seat includes a base, a back support, a hinge, and a seat belt integrated into the seat. The back support is capable of rotating relative to the base and thereby reclining. The hinge is between the base and the back support and is configured to lock the back support in positions in relation to the base. The seat belt has a shoulder portion and a lap portion and is attached to the seat at a shoulder anchor in the back support and a base anchor in the base. When a generated torque, created from a forward force applied by the shoulder portion of the seat belt, exceeds a threshold amount of torque, the hinge is configured to unlock and back support is configured to rotate forward from a reclined position towards an upright position.

20 Claims, 11 Drawing Sheets

(56) References Cited

U.S. PATENT DOCUMENTS

| | | | |
|---|---|---|---|
| 5,788,325 A | 8/1998 | Ganot | |
| 6,053,571 A | 4/2000 | Faigle | |
| 6,109,690 A * | 8/2000 | Wu | B60N 2/4228 297/216.13 |
| 6,209,955 B1 | 4/2001 | Seibold | |
| 7,604,081 B2 | 10/2009 | Ootani et al. | |
| 7,967,385 B2 | 6/2011 | Cillierre et al. | |
| 2002/0047295 A1* | 4/2002 | Sullivan | B60N 2/4221 297/216.1 |
| 2005/0023870 A1 | 2/2005 | Aufrere et al. | |
| 2005/0189748 A1* | 9/2005 | Wu | B60N 2/427 280/733 |
| 2006/0138797 A1* | 6/2006 | Wang | B60N 2/42745 296/68.1 |
| 2007/0278057 A1* | 12/2007 | Wereley | B60N 2/501 188/267.1 |
| 2011/0077826 A1* | 3/2011 | Baumann | B60N 2/42745 701/45 |
| 2012/0025019 A1 | 2/2012 | France et al. | |
| 2018/0134184 A1* | 5/2018 | Ketels | B60N 2/0228 |
| 2019/0118680 A1* | 4/2019 | Sagebiel | B60N 2/4242 |
| 2019/0308534 A1* | 10/2019 | Rosenberg | B60N 2/42754 |

* cited by examiner

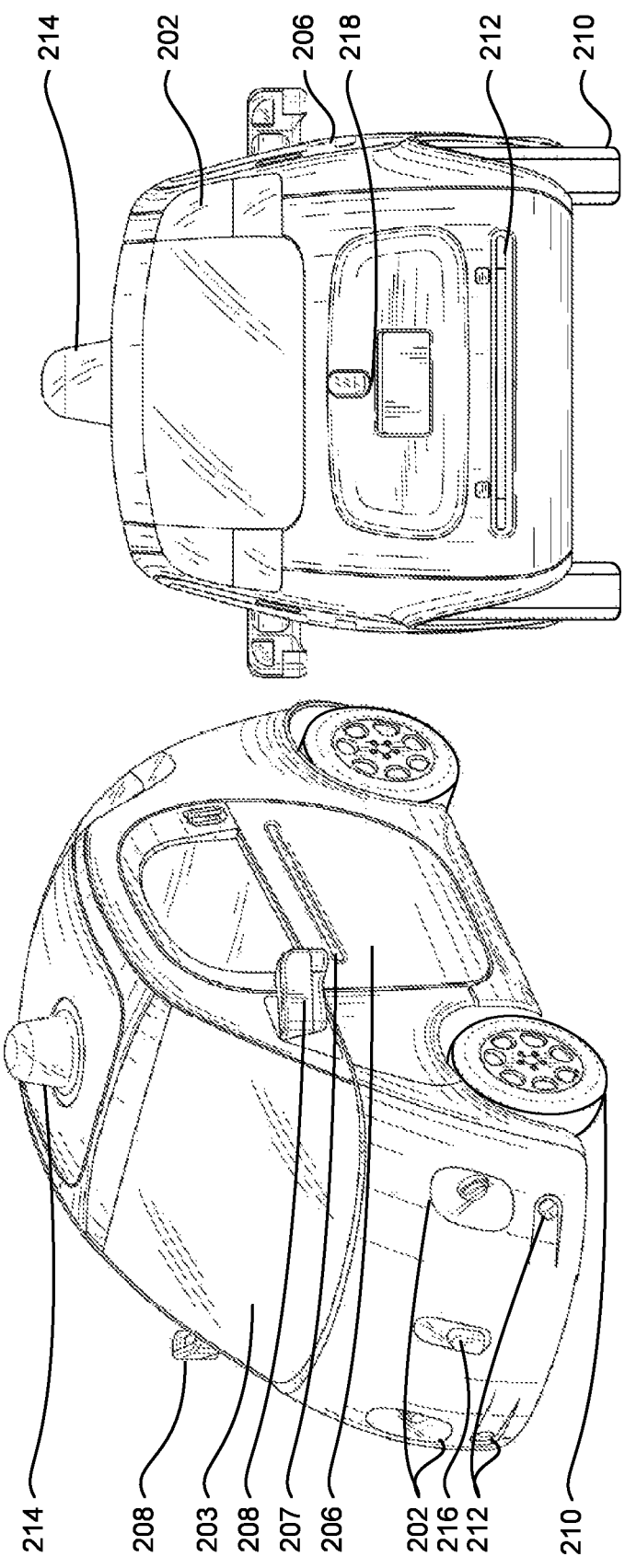

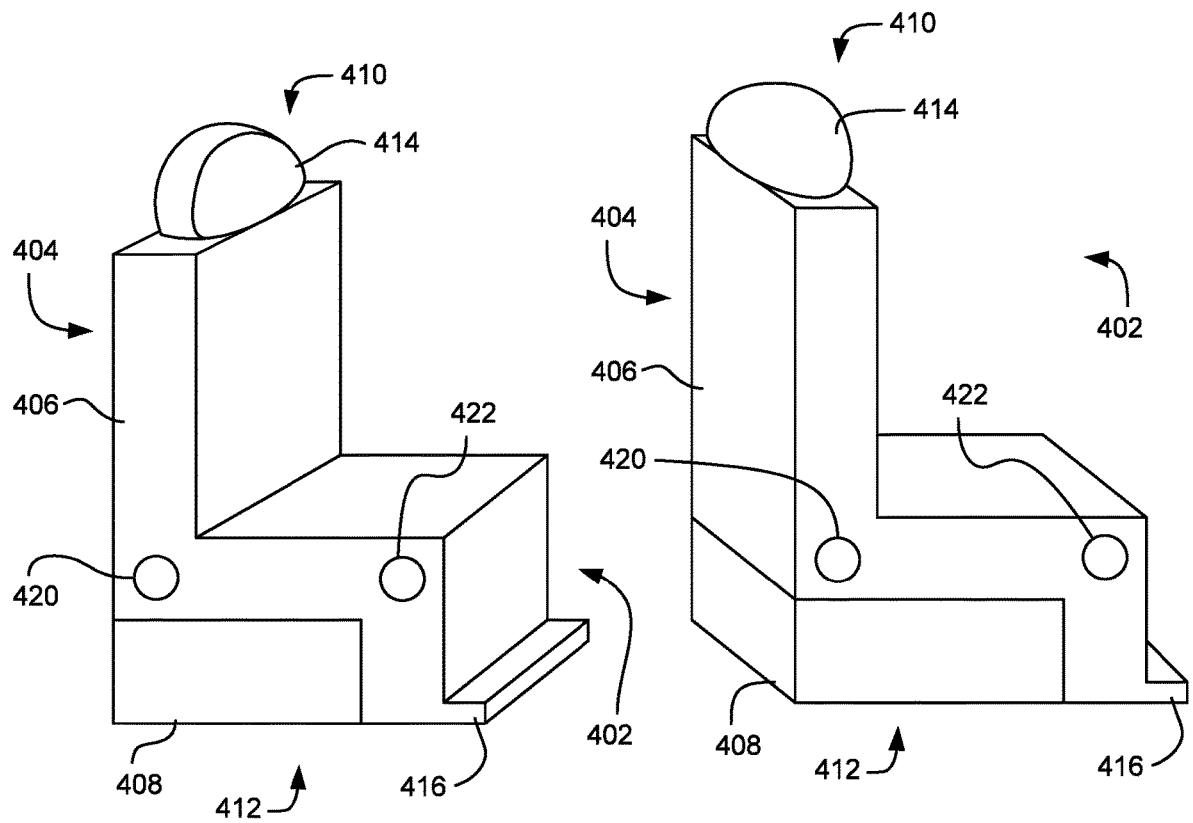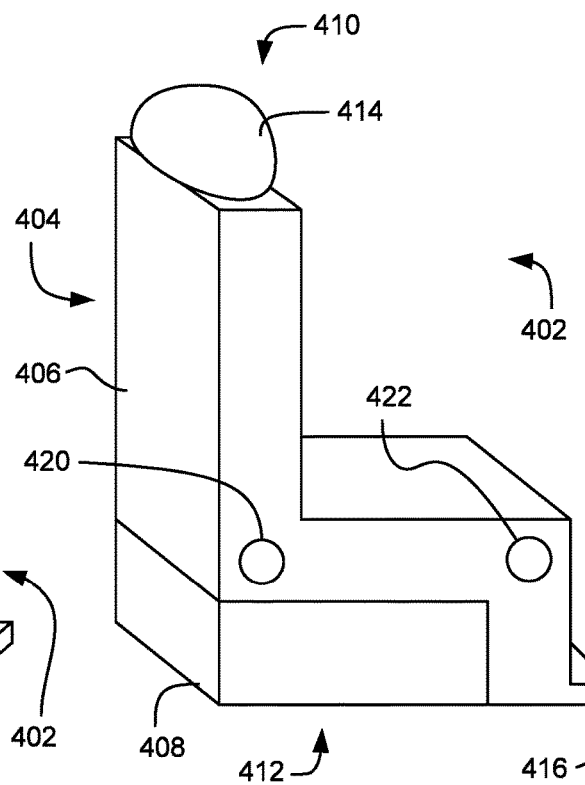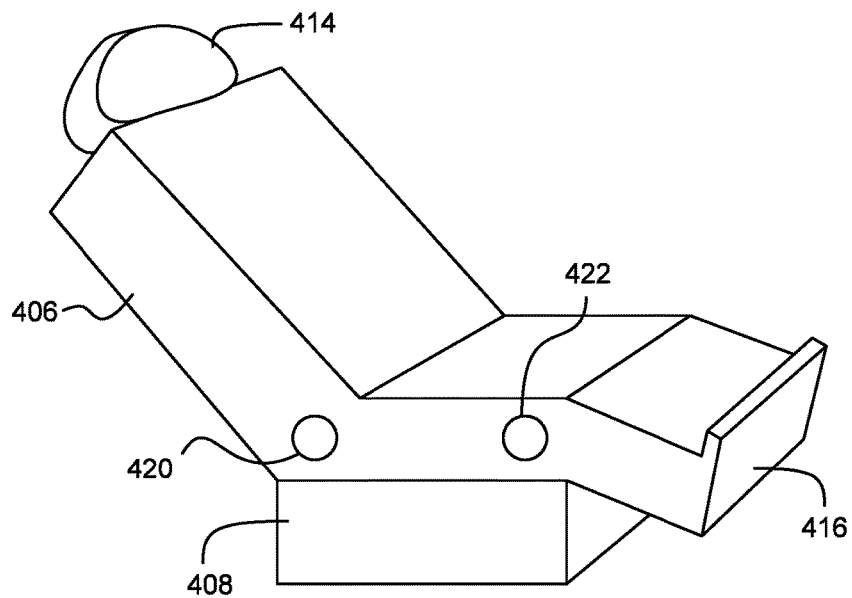

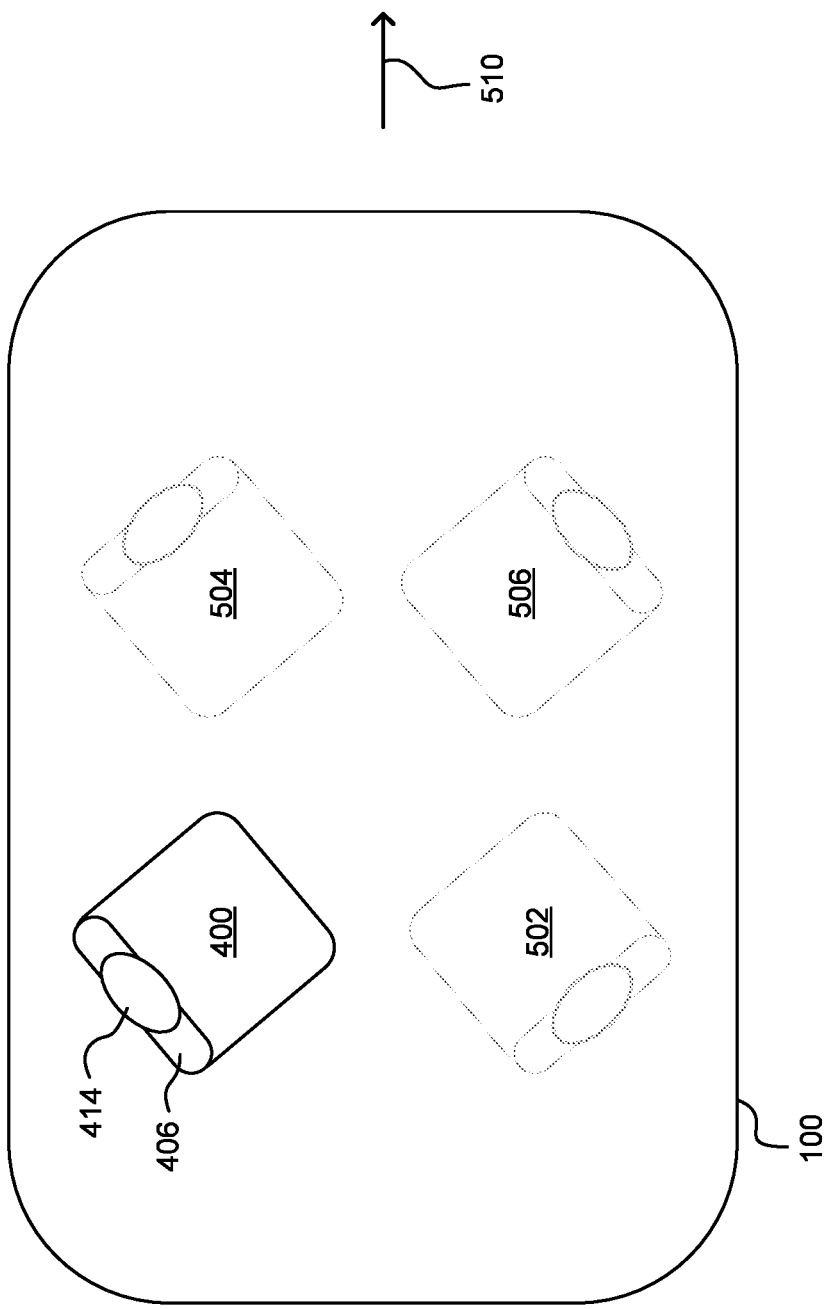

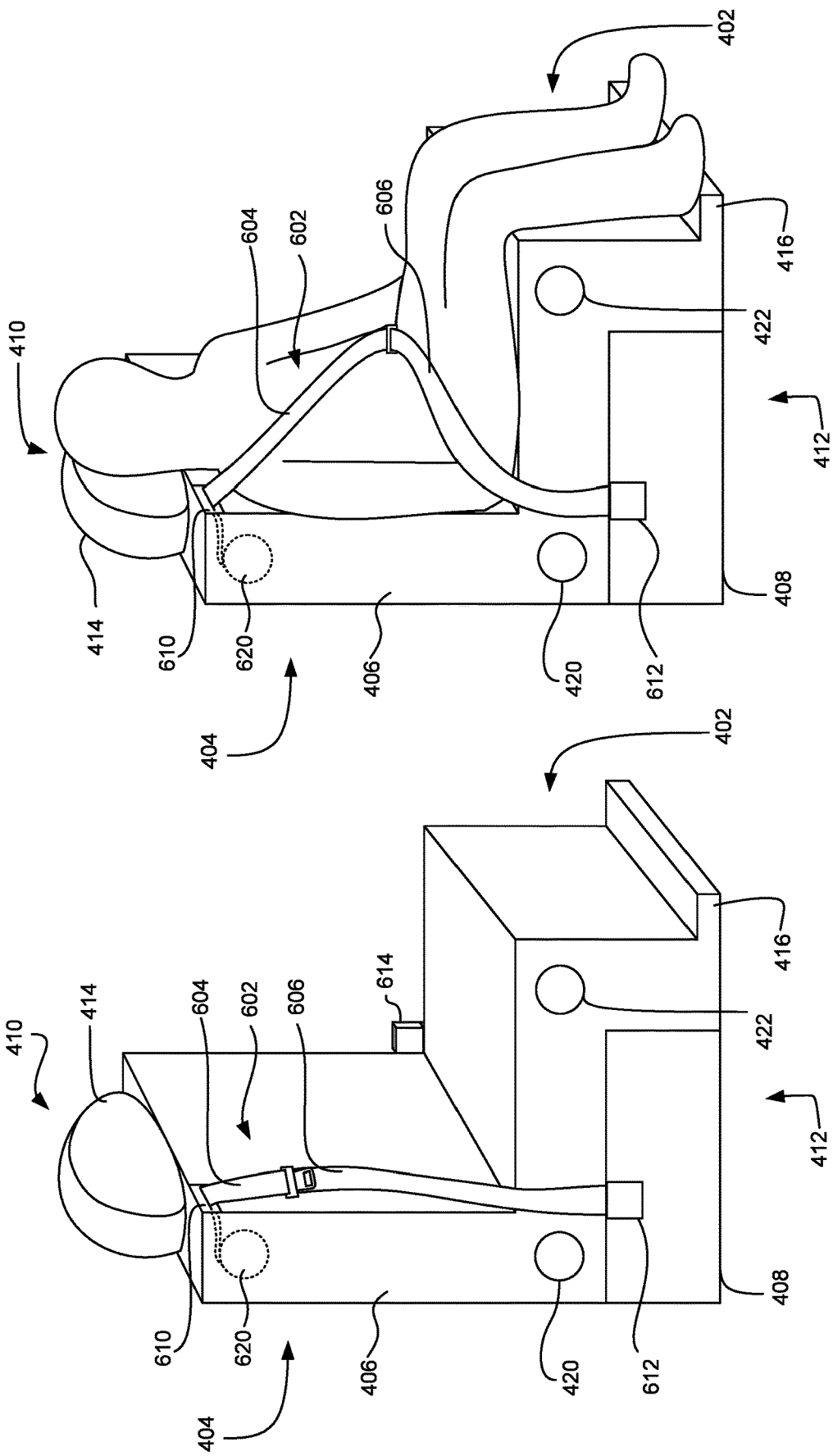

800

800

POSITION-VARIABLE SEAT BACK HINGE STIFFNESS FOR BELT-INTEGRATION SEATS

CROSS-REFERENCE TO RELATED APPLICATIONS

The present application is a divisional of U.S. patent application Ser. No. 15/792,937, filed Oct. 25, 2017, the disclosures of which are incorporated herein by reference.

BACKGROUND

When a collision actually occurs, non-autonomous and autonomous vehicles alike may include various safety mechanism systems to reduce injury to passengers. For example, the safety mechanism systems may include airbag systems employed to protect passengers from impacts with the interior of a vehicle after an object external to a vehicle has impacted a bumper of the vehicle.

BRIEF SUMMARY

Aspects of the disclosure provide for a system that includes a seat mounted in a vehicle. The seat includes a base, a back support that is capable of rotating relative to the base and thereby reclining, a hinge between the base and the back support where the hinge is configured to lock the back support in positions in relation to the base, and a seat belt integrated into the seat. The seat belt has a shoulder portion and a lap portion and is attached to the seat at a shoulder anchor in the back support and a base anchor in the base. When a generated torque, created from a forward force applied by the shoulder portion of the seat belt, exceeds a threshold amount of torque, the hinge is configured to unlock and the back support is configured to rotate forward from a reclined position towards an upright position.

In one example, the rotation of the back support is dampened by a brake on the hinge. When the generated torque exceeds an upper threshold amount, an amount of resistance applied on the hinge is optionally increased to slow the rotation of the back support. The shoulder anchor, in yet another example, is configured to receive the forward force.

The reclined position is optionally when the back support is at an angle greater than 25 degrees from a vertical plane, and the upright position is when the back support is at an angle at or less than 25 degrees from the vertical plane. In another example, the hinge is configured to lock in place when the back support reaches the upright position. Furthermore, the hinge is additionally or alternatively configured to lock in place when the generated torque becomes less than the threshold amount of torque.

In yet another example, the hinge is a first hinge, and the seat also includes a foot rest and a second hinge between the base and the foot rest. The second hinge in this example is configured to unlock and rotate along with the first hinge. The system optionally includes a reinforcement plate mounted on the vehicle under the seat. In this example, the reinforcement plate has a hardness and a thickness configured to withstand forces on the reinforcement plate caused by the back support when the back support rotates forward from the reclined position towards the upright position. In another example, the seat is capable of being positioned facing a direction other than towards a front of the vehicle. Additionally, the system optionally includes the vehicle.

Other aspects of the disclosure provide for a method. The method includes using a hinge of a seat between a back support of the seat and a base of the seat to lock the back support in a reclined position with respect to the base and using a seat belt retractor to lock a seat belt in response to a forward force at a shoulder portion of the seat belt. The seat belt is integrated in the seat. In addition, the method includes receiving continued forward force at the shoulder portion of the seat belt, wherein the continued forward force generates a torque at the hinge, and, when the generated torque at the hinge exceeds a threshold amount of torque, unlocking the back support to rotate forward in relation to the base in response to the continued forward force.

In one example, the method also includes applying resistance at the hinge to control the rotation of the back support in response to the continued forward force. In this example, the resistance at the hinge is optionally applied by a brake on the hinge. Another example of the method includes locking, using the hinge of the seat, the back support when the back support reaches an upright position. Additionally or alternatively, the method includes locking, using the hinge of the seat, the back support when the generated torque falls below the threshold amount of torque.

In another example, the reclined position is when the back support is at an angle greater than 25 degrees from a vertical plane, and the upright position is when the back support is at an angle at or less than 25 degrees from the vertical plane. The hinge is optionally a first hinge, and the method optionally also includes unlocking, using a second hinge of the seat between a foot rest of the seat and the base of the seat, the foot rest when the back support is unlocked.

Further aspects of the disclosure provide for a system that includes a seat mounted in a vehicle. The seat includes a base, a back support that is capable of rotating relative to the base and thereby reclining, a hinge between the base and the back support where the hinge is configured to lock the back support in positions in relation to the base, and a seat belt. The seat belt has a shoulder portion and a lap portion and is attached to the seat at a shoulder anchor in the back support and a base anchor in the base. This system also includes a reinforcement plate mounted on the vehicle under the seat. The reinforcement plate has a hardness and a thickness configured to withstand forces on the reinforcement plate caused by the back support when the back support rotates forward from a reclined position towards an upright position.

BRIEF DESCRIPTION OF THE DRAWINGS

FIGS. 2A-2D are example external views of the example vehicle in accordance with aspects of the disclosure.

FIGS. 4A-4C are views of an example seat 400 in accordance with aspects of the disclosure.

FIG. 5 is an example top-down view 500 of seats in a vehicle in accordance with aspects of the disclosure.

FIGS. 6A-6B are additional views of the example seat 400 in accordance with aspects of the disclosure.

DETAILED DESCRIPTION

Overview

The technology relates to a seat having an integrated seat belt in a vehicle, whether the vehicle is non-autonomous, autonomous, or semi-autonomous. While avoiding collisions with other objects is a primary goal for autonomous and semi-autonomous vehicles, in rare circumstances, there may be an unavoidable impact. When impact occurs, the vehicle's seat may be configured to move in order to absorb energy from the crash and increase the time over which the passenger experiences the load. The movement may reduce and dampen the peak impulse the passenger would have otherwise experienced, and may in turn reduce the amount of injury to a passenger in the event of a collision.

An integrated seat belt may be utilized in the seat to better secure a passenger in the event of a collision as well as allow for more mobility for the seat to move in order to absorb energy from a crash. The seat belt may be integrated in the seat at a shoulder anchor in the back support, a base anchor in the base of the seat, and a seat belt buckle in the base of the seat. The seat may be configured to recline to allow a passenger to lie at an angle or completely flat. To recline, the back support of the seat may rotate with respect to the base of the seat. A foot rest and/or the base of the seat may also be configured to rotate with respect to the base of the seat.

The back support of the seat may be configured to rotate relative to the base from a reclined position towards an upright position when a force is applied in a forward direction relative to the seat by an upper, or shoulder, portion of the seat belt. The force in the shoulder portion of the seat belt may be applied by a passenger's body moving in the forward direction when the vehicle is undergoing an impact. When the back support is reclined, the back support may unlock the hinge to allow the back support to move in relation to the base of the seat in response to the torque that is generated by the applied seat belt force. The back support may be configured to rotate to the upright position with some resistance for a period of time during which the generated torque is or exceeds the threshold amount of torque. The resistance may dissipate more energy and may further reduce the amount of injury to the passenger.

Example Systems

Figure 1:
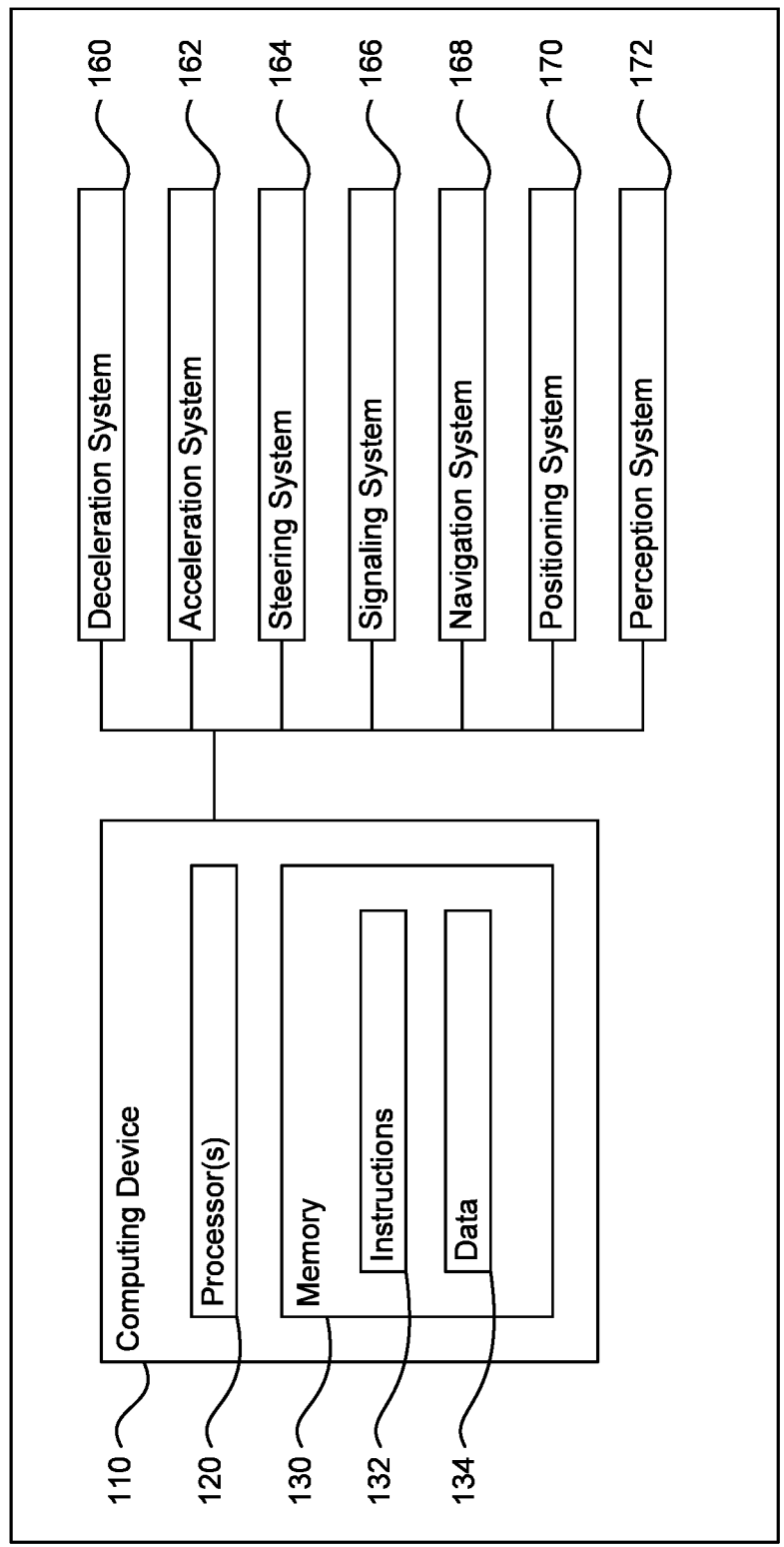
FIG. 1 is a functional diagram of an example vehicle 100 in accordance with aspects of the disclosure.
Figure 2A:
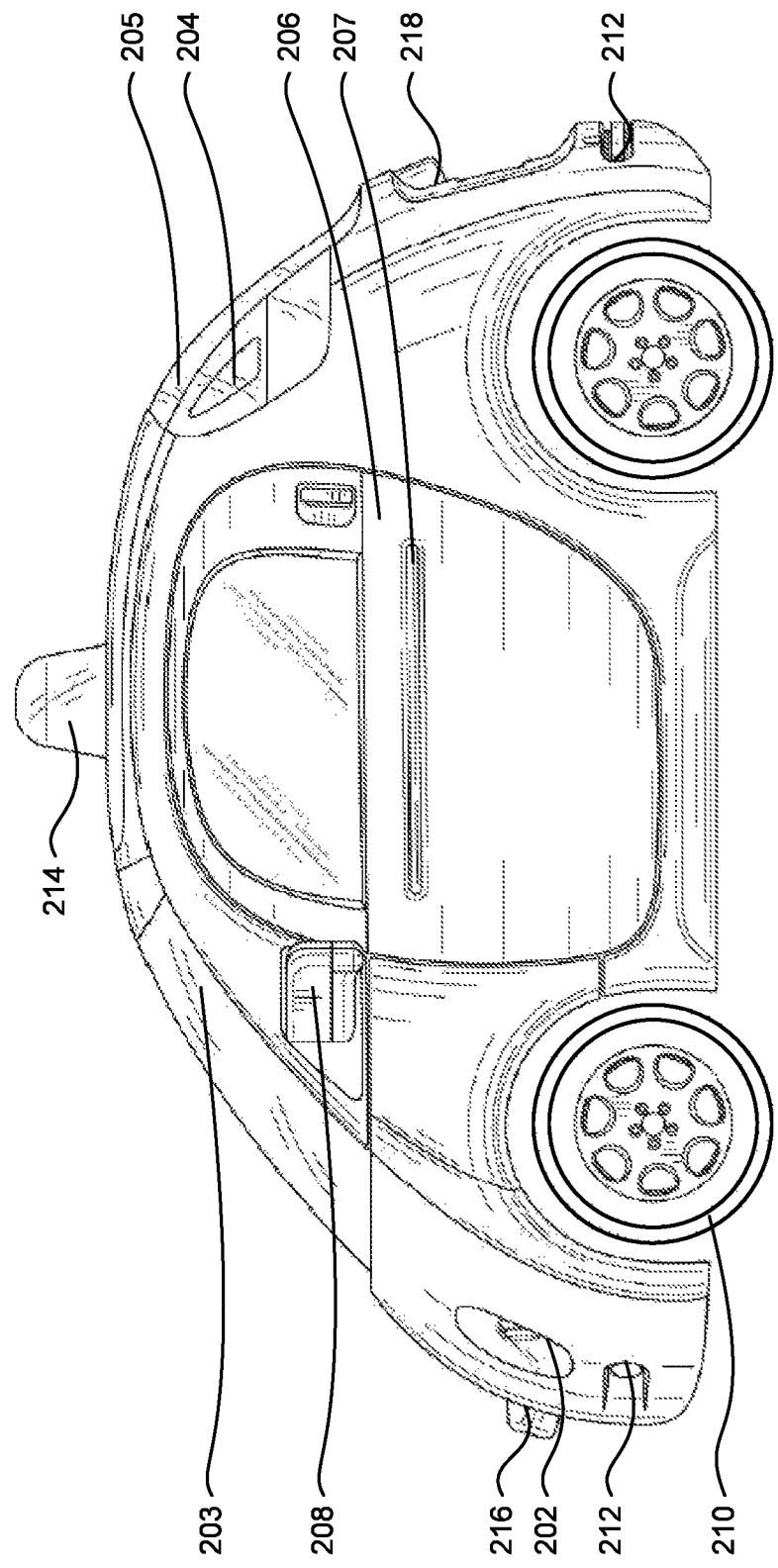
Figure 2D:
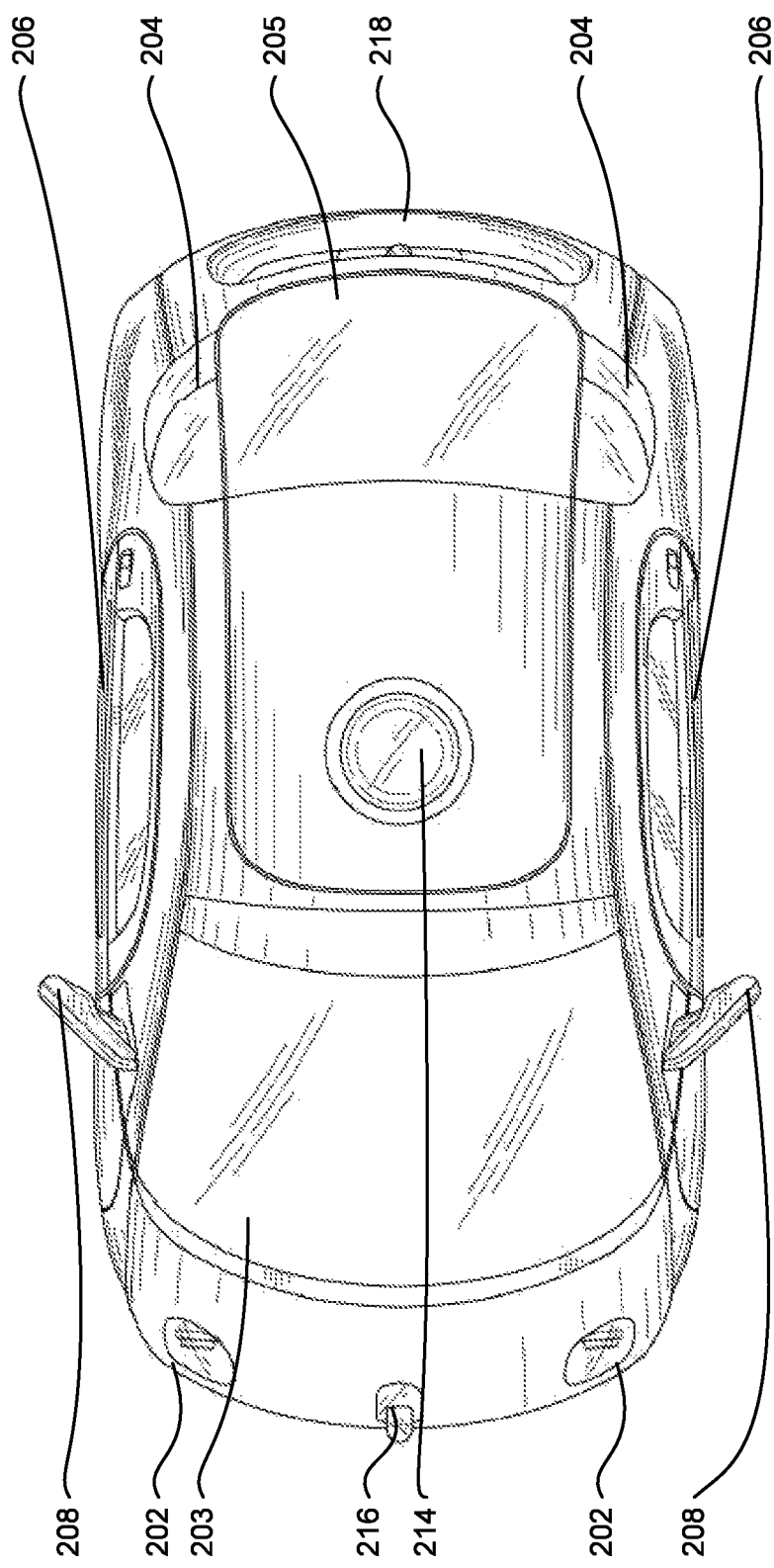

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). In this example, the vehicle includes an internal electronic display as well as one or more speakers to provide information or audio visual experiences. In this regard, internal electronic display may be located within a cabin of vehicle 100 and may be used by computing device 110 to provide information to passengers within the vehicle 100.

Computing device 110 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100, which is an autonomous or semi-autonomous vehicle. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, in order to control the movement, speed, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, instructions 132 and data 134.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than the absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser 214 (shown in FIGS. 2A-2D) or other sensors 216, 218 mounted on the front of the vehicle, back of the vehicle, roof, or other convenient location. In some vehicles, the perception system 172 may also include pressure transducers inside a vehicle structure configured to detect whether the vehicle structure is being compressed.

These sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the deceleration system 160 and the acceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 202, and turn signal/parking lights 212 may be associated the signaling system 166. Light bar 207 may also be associated with the signaling system 166. Vehicle 100 may also include various sensors 214, 216, 218 located around the vehicle 100.

Figure 3:
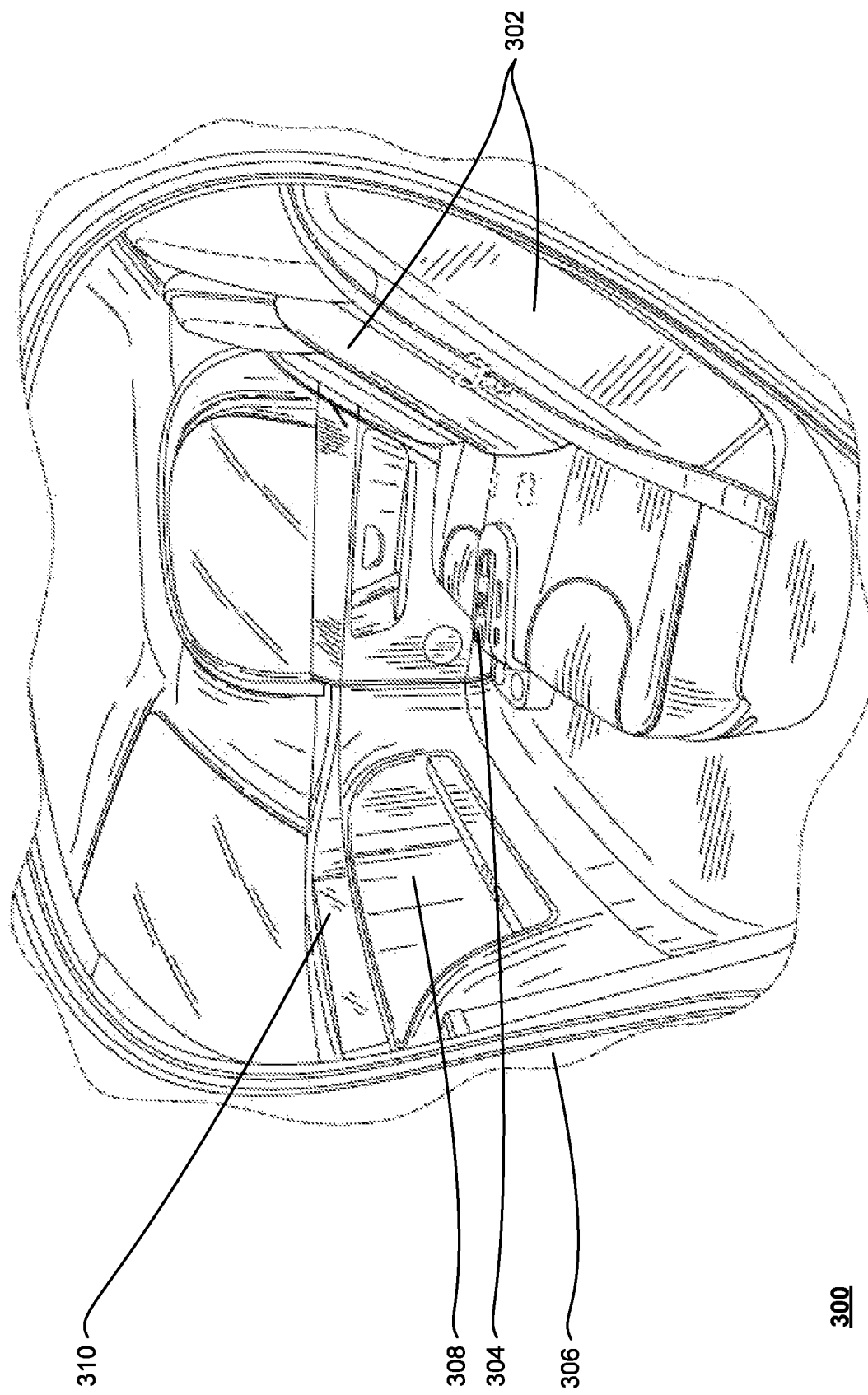
FIG. 3 is an example internal view 300 of the example vehicle in accordance with aspects of the disclosure.

FIG. 3 is an example internal view of vehicle 100 through the opening of door 206. In this example, there is of a row of two seats 302 for passengers with a console 304 between them. Directly in ahead of seats 302 is a dashboard configuration 306 having a storage bin area 308 and the internal electronic display 310. As can be readily seen, the vehicle does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, user input is limited to a microphone (not shown), features of the console 304, and wireless network connections in vehicle 100. In this regard, internal electronic display 310 merely provides information to the passenger and need not include a touch screen or other interface for user input. In other embodiments, the internal electronic display 310 may include a touch screen or other user input device for entering information by a passenger such as a destination, etc.

In certain implementations, one or more seats in the vehicle may be configured as shown in FIGS. 4A-4C. A seat 400 may have a front end 402 and a back end 404. The back end 404 may comprise a back support 406 extending upward from the back end of a base 408 of the seat. Also, the seat may have a top end 410 and a bottom end 412. The top end 410 may be the top of the back support 406 and may include a head rest 414, and the bottom end 412 may be the bottom of the base 408 of the seat and may include a foot rest 416. When a passenger is seated in the seat, he or she may have his or her back in contact with the back support 406 and be facing the front end 402 of the seat with his or her legs arranged over the front end of the base 408. The passenger's feet may be in contact with the foot rest 416. The seat 400 may include one or more seat sensors configured to detect seat metrics, such as a mass of the passenger, a position of the passenger in the seat, an angle the seat is reclined, and a position of the seat on its track. The seat metrics may be transmitted to the computing device 110.

As shown in FIGS. 4A and 4B, the seat 400 may be positioned in an upright position. An upright position may be, for example, where a back support is at an angle of 0 degrees, 25 degrees, or somewhere in between with respect to the vertical plane. Further, as shown in FIG. 4C, the seat 400 may be capable of reclining at an angled or completely flat position. The reclined position may be, for example, an angle more than 25 degrees with respect to the vertical plane and equal to or less than 90 degrees with respect to the vertical plane. To recline, the back support 406 of the seat may rotate with respect to the base 408 of the seat about a hinge 420. The foot rest 416 may also be configured to rotate with respect to the base 408 of the seat about a hinge 422.

One or more seats of the vehicle may be positioned in a non-traditional arrangement within the vehicle. For example, as shown in FIG. 5, seats 400, 502, 504, and 506 may be positioned in a circle facing each other in vehicle 100 while vehicle 100 is traveling in direction of arrow 510. Seats 400, 502, 504, and 506 are all not facing or oriented towards the direction of arrow 510 in which vehicle 100 is traveling. The seats 400, 502, 504, 506 of vehicle 100 may each be configured to translate and/or rotate independently within the vehicle to move into and out of the non-traditional arrangements.

A seat, such as seat 400, may include a seat belt integrated in the seat, as shown in FIGS. 6A and 6B. The seat belt 602 may be a three-point belt including a shoulder portion 604 and a lap portion 606. In other examples, the seat belt 602 may be a four-point belt or other type of seat belt that is integrated in the seat. The seat belt 602 may be integrated in the seat at a shoulder anchor 610 in the back support 406, a base anchor 612 in one side of the base 408 of the seat, and a seat belt buckle 614 in opposite side of the base 408 of the seat. The seat belt 602 may further include a seat belt retractor 620 configured to pull the seat belt taut or lock the seat belt in place. For example, the seat belt retractor 620 may lock the seat belt 602 in place when the seat belt is pulled suddenly.

As shown in FIG. 6B, when a passenger is seated in the seat 400, the seat belt may be buckled in the seat belt buckle 614. When buckled, the shoulder portion 604 may be positioned across the passenger's torso from the passenger's shoulder to the passenger's opposite hip, and the lap portion 606 may be positioned across the passenger's lap from one hip to the opposite hip. In some alternatives, the shoulder portion 604 and the lap portion 606 may be separate seat belts.

Figure 7:
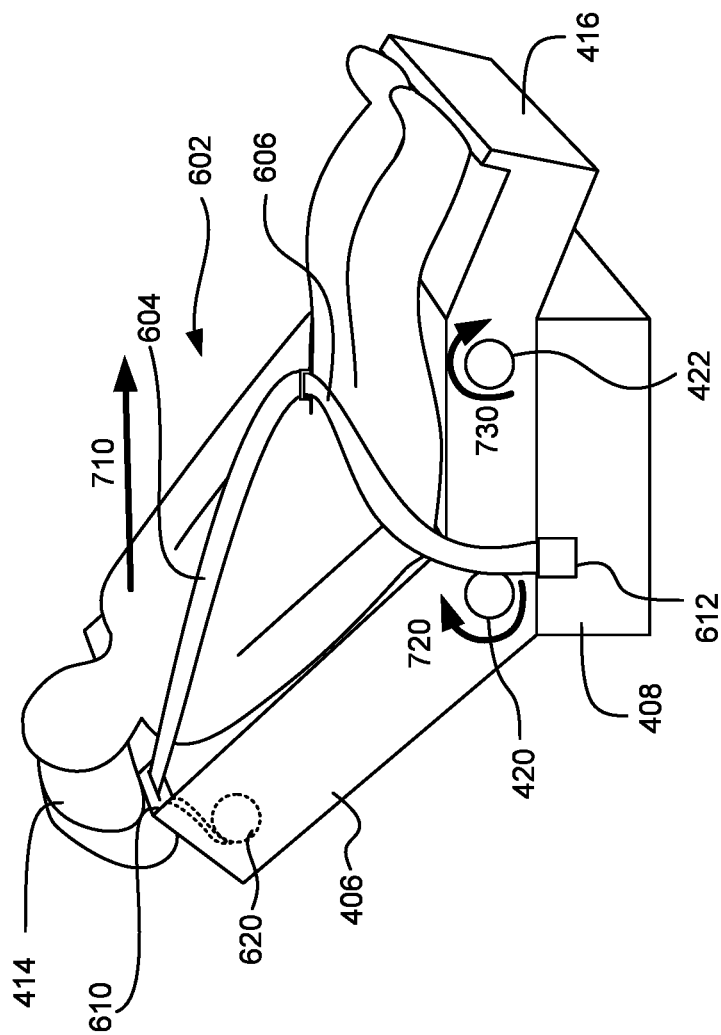
FIG. 7 is an example situational diagram in accordance with aspects of the disclosure.

The back support 406 of the seat may be configured to rotate relative to the base 408 from a reclined position towards the upright position when a force is applied in a forward direction relative to the seat 400 by the shoulder portion 604 of the seat belt 602. This seat belt force could be applied when the seat belt retractor 620 is locked while the vehicle is experiencing a collision, and the passenger's body starts to shift at least in part in the direction of arrow 710 as shown in FIG. 7. The force of the passenger's body against the locked seat belt 602 may generate a torque in the direction of arrow 720 at hinge 420 at the base 408 of the seat.

The torque generated by this seat belt force may be or exceed a threshold amount of torque and may be greater than the amount of torque that maintains the seat back in its orientation. The threshold amount of torque may be dependent on the mass of the passenger, the angle the seat is reclined, and the position of the seat on its track. For example, for a greater mass of the passenger, a greater amount of torque may be set as the threshold. For a greater reclining angle, a smaller amount of torque may be set as the threshold. For a position farther from the location of impact, a smaller amount of torque may be set as the threshold.

The seat metrics and updates to the seat metrics may be tracked by the computing device 110 of the vehicle 100. The threshold amount of torque may be updated as the mass of the passenger, the position of the passenger in the seat, the angle the set is reclined, and the position of the seat on its track is changed. In other examples, the threshold amount of torque may be updated based on the direction, magnitude, and timing of an expected crash impulse, which may be detected from the perception system 172, as well as presence of other countermeasures in the vehicle 100. The presence of countermeasures, such as airbags, may cause the threshold amount of torque to be lowered. The threshold amount of torque may be stored in the memory 130. In some examples, the threshold amount of torque may be set by applying an amount of resistance on hinge 420. For instance, the amount of resistance may be increased to effectively increase the threshold amount of torque, or the pressure may be decreased to effectively decrease the threshold amount of torque. In some examples, the resistance may be applied by a mechanical friction brake on the hinge 420 between the back support 406 and the base 408 of the seat. In other examples, hydraulic flow rotary dampers, pneumatic pistons, electromagnetic coils, magnetorheological fluids, or yielding materials (i.e. a piece of material that deforms) may be used to apply the rotation resistance.

When the threshold amount of torque is met or exceeded by the generated torque while the back support 406 is reclined, the hinge 420 between the back support 406 and the base 408 of the seat may be configured to unlock in order to allow the back support 406 to move in relation to the base 408 of the seat in response to the torque that is generated by the applied seat belt force. The back support 406 may be configured to rotate to the upright position with some resistance for a period of time during which the generated torque is or exceeds the threshold amount of torque set for the given situation. In this way, the back support 406 may rotate to the upright position in a controlled manner that helps to dissipate energy as the back support 406 moves. The computing device 110 may determine that the threshold amount of torque is met based on the torque generated by the applied seat belt force and unlock the hinge 420. The computing device 110 may unlock the hinge 420 by decreasing the amount of resistance applied on the hinge 420 such that the net torque on the back support 406 rotates the back support toward the upright position. Some resistance is maintained on the hinge 420 to control the rotation and dissipate energy, which may help to prevent any sudden movements that may cause the passenger to come out of contact with the back support. Alternatively, the threshold amount of torque may be met when the torque generated by the applied seat belt force becomes greater than the amount of resistance, at which point the net torque on the back support 406 may rotate the back support toward the upright position. In some implementations, the computing device 110 may determine that the generated torque exceeds an upper threshold amount and may increase the amount of resistance applied on the hinge 420 to slow the rotation of the back support 406. The upper threshold amount is higher than the threshold amount of torque.

The back support 406 may also be configured to safely lock in the upright position when the back support reaches the upright position. For example, the back support 406 may be configured to lock at an angle of 25 degrees with respect to the vertical plane. Alternatively, the back support 406 may lock in place after the generated torque becomes less than the threshold amount of torque. The computing device 110 may be configured to detect that the back support 406 is in the upright position and lock in the upright position, or the hinge 420 may be configured to automatically lock in the upright position.

In some implementations, the hinge 422 may be configured to unlock and rotate in the direction of arrow 730. The rotation of the hinge 422 may occur according to the rotation of the hinge 420. For example, the hinge 422 may rotate at the same or similar rate as the hinge 420 is being caused to rotate by the seat belt force.

In some cases, the hinge 420 between the back support 406 and the base 408 may be kept locked even when the threshold amount of torque is met or exceeded by the generated torque while the back support 406 is reclined. In one example, a second lock may be manually locked to keep the hinge 420 from moving. In another example, the computing device 110 may receive a user input indicating the hinge 420 should remain locked regardless of whether the threshold amount of torque is met or exceeded. The user input may be used to keep the hinge 420 locked when a carseat or booster seat is mounted on the seat 400.

The computing device 110 may additionally or alternatively be configured to determine that the hinge 420 should remain locked regardless of whether the threshold amount of torque is met or exceeded. For example, when the mass of the passenger is below a threshold mass, such as when the passenger is a small child, the computing device 110 may determine that the hinge 420 should be kept locked. The computing device 110 may also determine that the hinge 420 should be kept locked based on whether the passenger's feet reach a particular location on the foot rest 416. Other seat metrics or data collected by the seat sensor or other sensors in the vehicle may be used for this determination as well. For example, data such as weight distribution, shape of a mass in the seat, etc. may be used to determine whether there is an adult passenger in the seat.

Figure 8A:
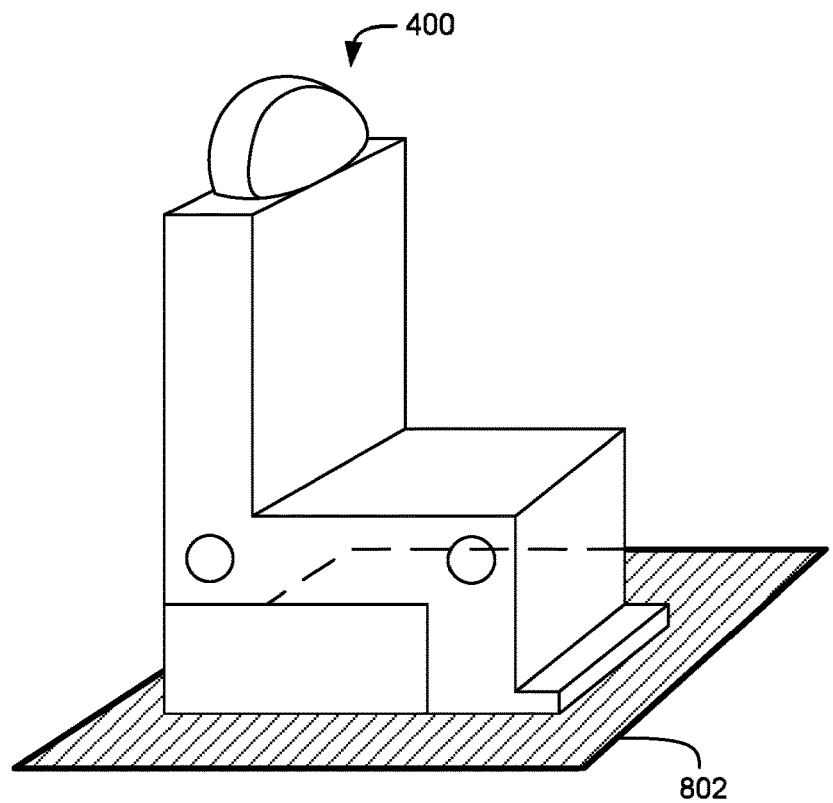
FIG. 8A is a perspective view of an example system 800 in accordance with aspects of the disclosure.
Figure 8B:
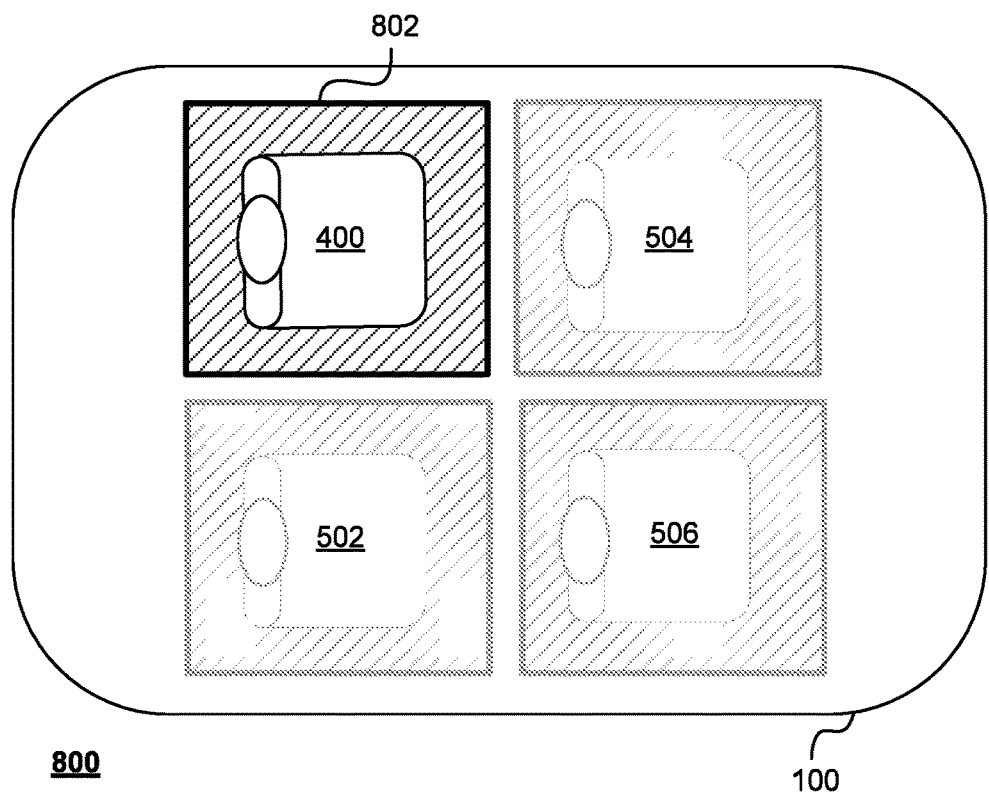
FIG. 8B is a top-down view of the example system 800 in accordance with aspects of the disclosure.

Additionally, as shown in FIGS. 8A and 8B, a reinforcement plate 802 may be included below the seat 400 in vehicle 100. In the event of a crash, the loads from a seat having an integrated seat belt, rather than a seat belt anchored to a B-pillar of the vehicle, are transferred to the floor pan of the vehicle. The reinforcement plate 802 may be mounted on the frame of the vehicle 100 that was designed for a seat with B-pillar seat belt mounts by fastening means, such as bolts, welds, or adhesives. In addition, the reinforcement plate 802 may have a hardness and thickness so that the reinforcement plate may absorb the total forces of the seat having the integrated seat belt, including the seat rotations, without breaking. The hardness and thickness of the reinforcement plate may be determined for a given seat by determining the greatest total amount of loads of the given seat on a floor pan during a crash. The hardness and thickness of the reinforcement plate of the given seat may be selected to withstand the determined greatest total amount of loads for the given seat. Different seats may have different amounts of loads. Therefore the reinforcement plate for different seats may vary in hardness and thickness. As shown in FIG. 8B, a reinforcement plate may be assembled below each seat in the vehicle 100. Alternatively, one large reinforcement plate may be assembled below the all the seats of the vehicle.

Example Operations

Figure 9:
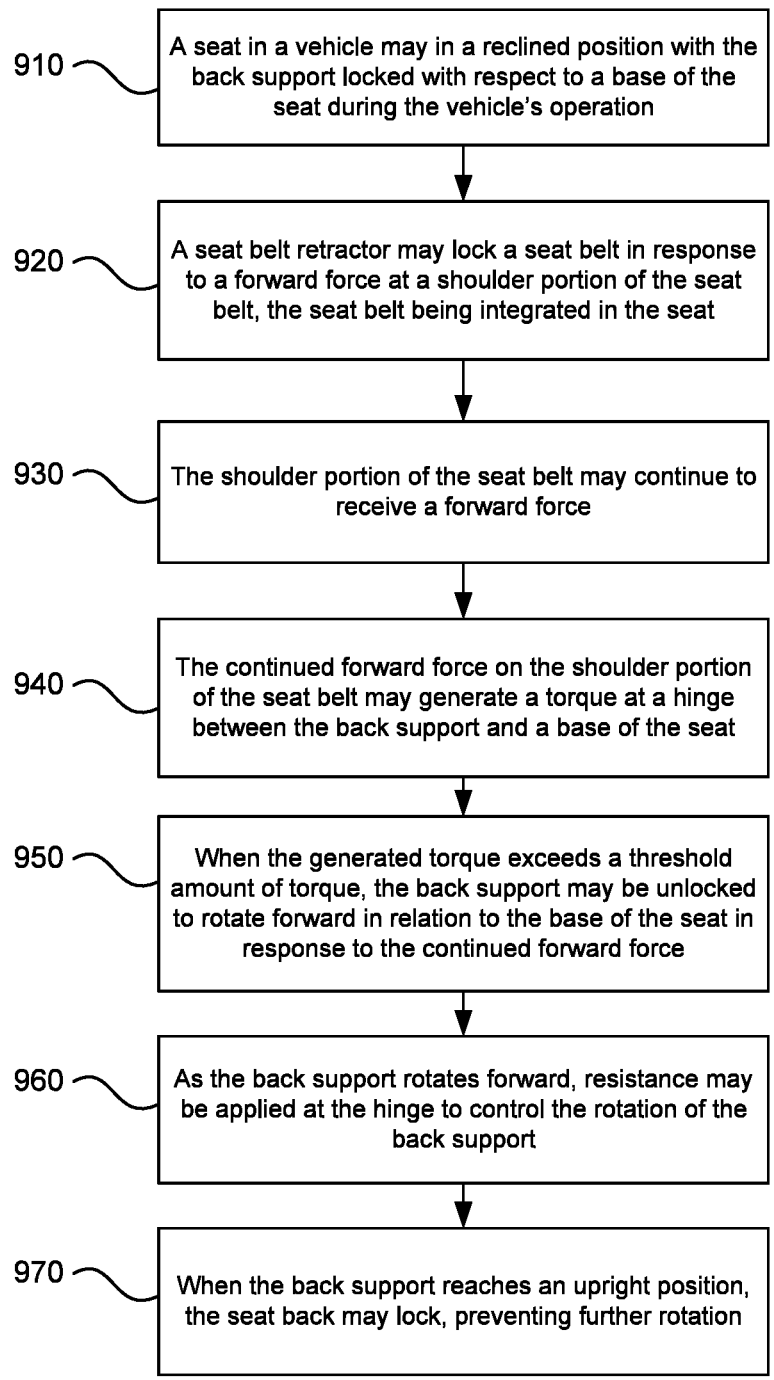
FIG. 9 is an example flow diagram 900 in accordance with aspects of the disclosure.

In FIG. 9, a flow diagram 900 is shown in accordance with some of operations of the seat 400 described above. While FIG. 9 shows blocks in a particular order, the order may be varied, and multiple operations may be performed simultaneously. Also, operations may be added or omitted.

In operation, at block 910, a seat in a vehicle may be in a reclined position with the back support locked with respect to a base of the seat during the vehicle's operation. The reclined position may be when the back support is at an angle greater than 25 degrees from the vertical plane. The seat may have an integrated seat belt. A passenger seated and reclined in the seat may therefore have the seat belt pulled taut over the passenger's body with the shoulder portion over the passenger's shoulder and across the passenger's torso and with the lap portion over the passenger's lap.

At block 920, a seat belt retractor may lock the seat belt in response to a sudden force forward. The sudden force forward may be, for example, a predetermined minimum amount of force on the seat belt caused by the passenger's body shifting forward and pushing against the shoulder portion of the seat belt over a brief period of time during a collision. At block 930, the shoulder portion of the seat belt may continue to receive a forward force, for instance caused by the passenger's body against the seat belt. The forward force from the passenger's body may continue as the collision continues to unfold. At block 940, the force on the shoulder portion of the seat belt may generate a torque at the hinge between the back support and the base of the seat.

At block 950, when the generated torque exceeds a threshold amount of torque, the back support may be unlocked to rotate forward in relation to the base of the seat in response to the applied force. At block 960, as the back support rotates forward, resistance may be applied at the hinge to control the rotation of the back support and to dissipate energy. At block 970, when the back support reaches an upright position, the seat back may lock, preventing further rotation. The upright position may be when the back support is between 0 and 25 degrees, inclusive, from the vertical plane. Additionally, the back support may lock when the generated torque becomes less than the threshold amount of torque.

The features described herein may provide for a system for moving seats in a vehicle to absorb crash energy and keep a passenger properly restrained during a collision. Should a collision occur, a passenger may be less seriously injured because the interaction between the restraint system and the passenger has been better optimized in a matter that lessens deceleration forces and limits unwanted passenger kinematics that could lead to injury. Medical bills may be less expensive as a result, and potential liability to vehicle owners may be reduced. In addition, seating system may also experience less acceleration from the collision and therefore may require fewer repairs or otherwise be more likely to be usable after the collision. Because these features involve an in-seat restraint system, more untraditional seating arrangements may be used in vehicles. Overall, the described features may increase passenger comfort without compromising safety.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   locking, using a hinge of a seat between a back support of the seat and a base of the seat, the back support in a reclined position with respect to the base;
   locking, using a seat belt retractor, a seat belt in response to a forward force at a shoulder portion of the seat belt, the seat belt being integrated in the seat;
   receiving, at the shoulder portion of the seat belt, continued forward force, wherein the continued forward force generates a torque at the hinge; and
   when the generated torque at the hinge exceeds a threshold amount of torque, unlocking the back support to rotate forward in relation to the base in response to the continued forward force.

2. The method of claim 1, further comprising determining, by one or more processors, that the generated torque at the hinge exceeds the threshold amount of torque; and
   wherein unlocking the back support to rotate forward in relation to the base is performed by the one or more processors in response to the determining that the generated torque exceeds the threshold amount of torque.

3. The method of claim 2, further comprising determining, by the one or more processors, the threshold amount of torque based on one or more seat metrics received from one or more sensors of the seat.

4. The method of claim 1, further comprising applying resistance at the hinge to control the rotation of the back support in response to the continued forward force.

5. The method of claim 4, further comprising:
   determining, by one or more processors, the generated torque exceeds an upper threshold amount; and
   increasing, by the one or more processors, an amount of resistance applied on the hinge in response to the determining that the generated torque exceeds the upper threshold amount.

6. The method of claim 1, further comprising locking, using the hinge of the seat, the back support when the back support reaches an upright position.

7. The method of claim 1, further comprising locking, using the hinge of the seat, the back support when the generated torque falls below the threshold amount of torque.

8. The method of claim 1, wherein the reclined position is when the back support is at an angle greater than 25 degrees from a vertical plane.

9. The method of claim 1, wherein:
   the hinge is a first hinge; and
   the method further comprises:
      unlocking, using a second hinge of the seat between a foot rest of the seat and the base of the seat, the foot rest when the back support is unlocked.

10. A system for controlling a seat in a vehicle, the system comprising:
    one or more seat sensors in the seat, the one or more seat sensors being configured to detect an angle of recline between a back support of the seat and a base of the seat; and
    one or more computing devices in communication with the one or more seat sensors, the one or more computing devices being configured to:
       receive the angle of recline from the one or more seat sensors;
       determine an amount of torque generated at a hinge of the seat between the back support and the base by a continued forward force from a seat belt integrated in the seat; and
       unlock the back support to rotate forward in relation to the base in response to the continued forward force when the generated torque at the hinge exceeds a threshold amount of torque.

11. The system of claim 10, wherein the one or more computing devices are further configured to determine that the generated torque at the hinge exceeds the threshold amount of torque.

12. The system of claim 11, wherein the one or more seat sensors are further configured to detect one or more seat metrics in addition to the angle of recline; and
    the one or more computing devices are further configured to determine the threshold amount of torque based on one or more seat metrics.

13. The system of claim 10, wherein the one or more computing devices are further configured to apply resistance at the hinge to control rotation of the back support in response to the continued forward force.

14. The system of claim 13, wherein the computing devices are further configured to:
    determine the generated torque exceeds an upper threshold amount; and
    increase an amount of resistance applied on the hinge after the generated torque is determined to exceed the upper threshold amount.

15. The system of claim 10, wherein the one or more computing devices are further configured to lock, using the hinge of the seat, the back support when the back support reaches an upright position.

16. The system of claim 10, wherein the one or more computing devices are further configured to lock using the hinge of the seat, the back support when the generated torque falls below the threshold amount of torque.

17. The system of claim 10, wherein the reclined position is when the angle of recline is greater than 25 degrees from a vertical plane.

18. The system of claim 10, wherein the hinge is a first hinge; and
   the one or more computing devices are further configured to unlock, using a second hinge of the seat between a foot rest of the seat and the base of the seat, the foot rest when the back support is unlocked.

19. The system of claim 10, further comprising a reinforcement plate mounted on the vehicle under the seat.

20. The system of claim 10, further comprising the vehicle.

* * * * *